April 2, 1968     D. W. TAYLOR ET AL     3,376,472
THYRISTOR SWITCHING MEANS FOR FLASHING ELECTRICAL LAMPS
Filed June 7, 1965
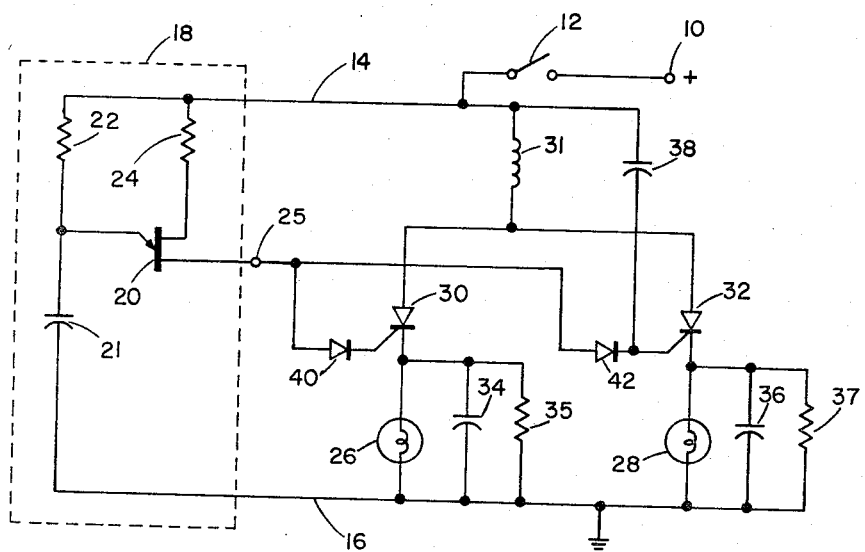
INVENTORS.
Douglas W. Taylor
Rueben Wechsler
Albert L. Markle
BY
ATTYS.

United States Patent Office 3,376,472
Patented Apr. 2, 1968

3,376,472
THYRISTOR SWITCHING MEANS FOR
FLASHING ELECTRICAL LAMPS
Douglas W. Taylor and Reuben Wechsler, Phoenix, and
Albert L. Markle, Mesa, Ariz., assignors to Motorola,
Inc., Franklin Park, Ill., a corporation of Illinois
Filed June 7, 1965, Ser. No. 461,754
8 Claims. (Cl. 315—226)

ABSTRACT OF THE DISCLOSURE

A two-thyristor switching system connected through an inductance to a power supply for alternately lighting electrical lamps connected to and receiving current from the respective thyristors. A capacitor connected across each of the device lamps is charged by current flowing through the respective thyristors. The capacitor being charged serves to extinguish the connected thyristor when the supply voltage drops due to energization of the lamp connected to the other thyristor. A resistor is connected across each lamp to permit operation after lamp failure. A pulser supplies pulses through a pulse steering means to alternately actuate the thyristors to current conduction.

This invention relates generally to electrical energizing circuits, and particularly to circuits utilizing silicon controlled rectifiers as switches to alternately energize one of a pair of devices such as flasher lamps.

It is desired in many applications to intermittently energize one of a pair of electrical devices. One such application is in flasher warning lights which may be used on aircraft or other vehicles, and at ground positions. In such case two incandescent lights may be alternately energized to provide a very readily apparent flashing indication. Although various mechanical arrangements have been used for this purpose such as relays or cam operated switches these have the disadvantage that they are subject to wear and require substantial maintenance. As indicated above such lights may be required on vehicles in which case size and weight are important considerations. It has also been proposed to provide electrical circuits for energizing flasher lights, but these have been complicated and not entirely satisfactory.

It is, therefore, an object of the present invention to provide a simple, all electronic switching circuit for intermittently energizing a pair of electrical devices.

Another object of the invention is to provide a solid state switching circuit for flashing lamps which is of inexpensive construction.

A further object of the invention is to provide an electronic switching circuit for intermittently energizing devices wherein the radio frequency interference produced is a minimum.

Still another object of the invention is to provide a circuit for intermittently energizing flashing warning lights which is reliable in operation and wherein the flashing operation of one light continues in the event the other light burns out.

A feature of the invention is the provision of an energizing circuit including a pair of reverse blocking triode thyristors individually connected to devices to be energized, including a connection to one thyristor so that it conducts when the system is turned on, and a pulse circuit applying pulses to the thyristors so that they are thereafter rendered alternately conducting to energize the devices alternately.

Another feature of the invention is the provision of a circuit for alternately energizing a pair of flasher lamps wherein the energizing current flows through an inductor so that the current surge through the lamps is reduced and the required surge current handling capacity of the reverse blocking triode thyristors is minimized. A capacitor is bridge across each lamp and the capacitors cooperate with the inductor to provide a reverse bias to turn off the conducting thyristor when the other thyristor is rendered conducting.

Another feature of the invention is the provision of an electronic switching circuit for flasher lamps as described in the preceding paragraph which includes a resistor across each lamp and capacitor for providing a circuit to discharge the capacitor in the event that a lamp burns out, so that the system remains operative and the operating lamp continues to flash in the desired manner.

The invention is illustrated in the drawing, the single figure of which is a circiut diagram of the flashing lamp circuit.

In accordance with the invention, a pair of incandescent flasher lamps are individually energized through reverse blocking triode thyristors which are connected to a source of potential through a common inductor. A capacitor and a resistor are bridged across each of the lamps. A pulsing circuit is provided which may include a unijunction transistor for providing regularly recurring pulses. The pulsing circuit is coupled through separate diodes to the control gates of the two thyristors. The pulsing circuit has a time delay, and a capacitor is coupled from the power supply to the gate of one thyristor to apply a pulse thereto to render this thyristor conducting when the circuit is turned on. This prevents simultaneous turn on of both thyristors by the pulsing circuit. When one thyristor conducts, the diode coupled to apply pulses thereto is biased off, so that the pulses are applied only to the other thyristor. This turns on the other thyristor so that current flows through the inductor to the incandescent lamp and to charge the capacitor bridge thereacross. A surge of current is produced both because of the resistance characteristics of the incandescent lamp and the charging characteristics of the capacitor. The inductor reduces and smoothes this surge and acts to drop the voltage applied to the thyristors. The thyristor which has been conducting has supplied current to charge the capacitor connected across the lamp associated therewith. Accordingly, when the voltage applied to the thyristor drops because of the energization of the second lamp, the voltage across the charged capacitor back biases the conducting thyristor to cut off the same and de-energize the lamp connected thereto. Accordingly, the two thyristors are alternately conducting to energize the lamps and provide flashing operation thereof. The resistors connected across the lamps act to complete the circuit for discharging the associated capacitor, so that the operation continues in the event that one of the lamps burns out. In such case, the remaining lamp will continue to flash at its usual rate.

Referring now to the drawing, a positive voltage is applied from potential supply terminal 10 through operating switch 12 to conductor 14. This potential is positive with respect to the potential on conductor 16, which is connected to a reference potential shown as ground. A pulsing circuit 18 is provided which includes unijunction transistor 20. Capacitor 21 is charged through resistor 22 to provide a potential to the emitter electrode of transistor 20 to render the same conducting. When transistor 20 is rendered conducting, the voltage from conductor 14 is applied through resistor 24 and the interconnected base electrodes of transistor 20 to output terminal 25 of the pulsing circuit. It is pointed out that the unijunction transistor circuit provides a simple form of pulsing circuit for the present application, but that circuits of other forms may obviously be used.

In the circuit illustrated, a pair of incandescent lamps 26 and 28 are shown as the devices to be energized. It is to be pointed out that the circuit illustrated can be used to energize other devices in place of the lamps 26 and 28 and these are representative of any electrical devices which it may be desired to energize alternately. The lamps are selectively energized by semiconductor switches, which may be of the type known as reverse blocking triode thyristors. Lamp 26 is connected in series with the reverse blocking triode thyristor 30 and inductor 31 between conductors 14 and 16. Similarly, lamp 28 is connected in series with the reverse blocking triode thyristor 32 and the inductor 31 between conductors 14 and 16. Capacitor 34 and resistor 35 are bridged across the lamp 26, and capacitor 36 and resistor 37 are bridged across the lamp 28. The positive conductor 14 is connected through capacitor 38 to the gate electrode of thyristor 32. The output terminal of the pulsing circuit is connected through diode 40 to the gate electrode of thyristor 30, and through diode 42 to the gate electrode of thyristor 32.

Considering now the operation of the circuit, when the switch 12 is first closed, current is applied through resistor 22 to charge capacitor 21 of the pulsing circuit, and the first pulses will be provided thereby after a delay time provided by this charging action. During this time, the charging current applied through capacitor 38 to the gate electrode of reverse blocking thyristor 32 acts to render this thyristor conducting. Lamp 28 is therefore energized without significant delay. This forms a starting circuit for the system, and capacitor 38 has no function after the operation has started.

The pulsing circuit 18 will then apply a pulse at terminal 25 after a delay which is controlled by the values of resistor 22 and capacitor 21. The resistor 22 controls the charging current applied to capacitor 21, and the value of capacitor 21 cooperates therewith to provide a voltage at the emitter of transistor 20 adequate to render the transistor conducting after a predetermined time delay. When thyristor 32 conducts, the lamp 28 is energized and the capacitor 36 connected thereacross starts to charge. The resistance of the lamp is low when the lamp is first energized so that the instantaneous current is high. Further, the charging current for capacitor 36 at start will be high so that the current drawn through thyristor 32 will be maximum when the rectifier first starts to conduct. This will cause the voltage at the anodes of the thyristors 30 and 32 to fall to a relatively low value and then return to a steady state value as determined by the inductor 31.

When a pulse is applied from the pulse circuit 18 to the terminal 25 and thyristor 32 is conducting as set forth above, diode 42 will be biased off by the potential at the gate electrode of thyristor 32. The pulse will be applied through diode 40 to the gate electrode of thyristor 30 to render the same conducting. This will cause a surge of current through lamp 26 and charging current to capacitor 34 so that the voltage at the anodes of thyristors 30 and 32 will drop, as set forth above. Since capacitor 36 is now charged, it will apply a positive bias to the cathode of thyristor 32 to reverse bias this thyristor so that it is cut off. When thyristor 32 is cut off capacitor 36 will discharge through lamp 28 and resistor 37. Thyristor 30 will continue to conduct to energize lamp 26 and to charge capacitor 34 until the next pulse is applied to terminal 25. This pulse will pass through diode 42 to the gate electrode of thyristor 32 to render this thyristor conducting. The charge across capacitor 34 will now act to reverse bias thyristor 30 to cut it off, and capacitor 34 will then discharge through lamp 26 and resistor 35. It will be apparent that the two thyristors will alternately conduct and then be biased off to insure commutating action.

As stated above, when each reverse blocking triode thyristor is rendered conducting there is a tendency for a surge of current through that branch of the circuit. The inductor 31 tends to reduce this surge of current and smoothes the current to eliminate spikes. This is advantageous since the reduction of the maximum current increases the life of the incandescent lamps or other energized devices, and also reduces the required current capacity of the thyristors. Further, the smoothing of the current acts to reduce radio frequency interference applied to the potential supply 10 which may be caused by the switching transients of the thyristors. In many cases it may be desired to use the flasher circuit in an environment where radio communication or control takes place and the reduction in interference produced is very important.

The resistors 35 and 37 connected across the lamps 26 and 28 are not essential to the basic operation of the circuit but cause continued operation of the flasher circuit in the event that one of the bulbs 26 or 28 burns out. As set forth above, these resistors together with the lamps provide paths for discharge of the capacitors 34 and 36 connected across the lamps. If the capacitors did not discharge, the circuit would not continue to oscillate, and the resistors insure that there is a discharge path even when one lamp is burned out. In such case, the other bulb will be intermittently energized and this will provide an indication even though one bulb is burned out. It is to be noted that the capacitors are always charged to the same polarity so that polarized capacitors can be used.

In the event that for some reason the voltage is applied slowly to the system when the switch 12 is operated, and the charging current through capacitor 38 does not turn on thyristor 32, the first pulse applied to the system from terminal 25 will tend to turn on thyristor 30. This action can result because of the unbalance of the two gate circuits resulting from the connection of capacitor 38. As previously stated, in the normal, instantaneous turn on action the charging current through capacitor 38 renders thyristor 32 conducting, but if this instantaneous action fails, thyristor 30 may be rendered conducting by the first pulse applied thereto. This can insure that only one of the lamps is initially energized, so that the lamps are then alternately energized, and tends to prevent the simultaneous energization of the two lamps.

The trigger action of the thyristors by the pulses from the pulse supply 18 is relatively uncritical as to pulse width and amplitude. As has been described, the pulses are used only to turn on the non-conducting thyristor. When this thyristor is turned on, the circuit acts independently of the pulses to cut off the previously conducting thyristor. Since this thyristor is reverse biased, the cut off is very positive to provide the desired flashing operation.

The flasher circuit of the invention has been found to be highly satisfactory in actual use. The circuit is quite inexpensive as the reverse blocking triode thyristors can have a minimum current rating, and the capacitors connected across the lamps can be of the polarized type. The single capacitor required for starting may be very inexpensive. Because the current surge is held to a minimum, the life of the lamps is increased. The circuit also has the advantage that it tends to prevent both lamps from being simultaneously energized, and also that one lamp will continue to flash if the other lamp burns out.

What is claimed is:

1. An electrical circuit for alternately energizing first and second cyclically operated devices including in combination, first and second semiconductor switch means each having a control electrode and being rendered conducting by a pulse applied to said control electrode, inductor means, circuit means connecting each of the devices in series with one of said switch means and with said inductor means across potential supply means, first and second capacitors individually connected across the devices and charged when said switch means connected thereto is conducting, pulse supply means for producing regularly recurring pulses, first and second rectifier means individually connecting said pulse supply means to said control electrodes of said first and second switch means respectively, said rectifier means connected to a conducting switch means being biased to be non-conducting so that each pulse is applied only to said switch means which is non-conducting to render the same conducting, with conduction of one switch means providing a surge of current therethrough so that the potential across said inductor means reduces the potential applied to said first and second switch means, and said capacitor means coupled to the other device being charged to provide a potential to said switch means connected thereto to cut off the same.

2. An electrical circuit for alternately energizing first and second cyclically operated devices including in combination, first and second semiconductor switch means each having a control electrode and being rendered conducting by a pulse applied to said control electrode, inductor means, circuit means connecting each of the devices in series with one of said switch means and with said inductor means across potential supply means, first and second capacitors individually connected across the devices and charged when said switch means connected thereto is conducting, means applying a pulse to said control electrode of said first switch means to render the same conducting to initiate operation of the circuit, pulse supply means for producing regularly recurring pulses, first and second rectifier means individually connecting said pulse supply means to said control electrodes of said first and second switch means respectively, said rectifier means connected to a conducting switch means being biased to be non-conducting so that each pulse is applied only to said switch means which is non-conducting to render the same conducting, with conduction of one switch means providing a surge of current therethrough so that the potential across said inductor means reduces the potential applied to said first and second switch means, and said capacitor means coupled to the other device being charged to provide a potential to said switch means connected thereto to cut off the same.

3. An electrical circuit for alternately energizing first and second cyclically operated devices including in combination, potential supply means providing a direct current potential between a first voltage point and a reference point, first and second semiconductor switch means each having a gate electrode and output electrodes providing a conducting path in response to a pulse applied to said gate electrode, inductor means, circuit means connecting each of the devices in series with said output electrodes of one of said switch means and with said inductor means in the order named between said reference point and said first voltage point, first and second polarized capacitors individually connected across the devices and charged when said switch means connected thereto is conducting, pulse supply means for producing regularly recurring pulses, and first and second rectifier means individually connecting said pulse supply means to said gate electrodes of said first and second switch means respectively, said rectifier means connected to a conducting switch means being biased to be non-conducting by the potential at said gate means thereof so that each pulse is applied only to said switch means which is non-conducting to render the same conducting, with conduction of one switch means providing a surge of current therethrough to cause a drop in the potential across said inductor means which reduces the potential applied to said first and second switch means, and said capacitor coupled to the other switch means being charged by conduction thereof to provide a reverse bias potential at said other switch means to cut off the same, said inductor means acting to isolate said potential supply means from transients resulting from the switching action of said switch means.

4. An electrical circuit for alternately energizing first and second cyclically operated devices including in combination, first and second reverse blocking triode thyristors each having a gate electrode and output electrodes providing a conducting path in response to a pulse applied to said gate electrode, inductor means, circuit means connecting each of the devices in series with said output electrodes of one of said thyristors and with said inductor means across potential supply means, first and second capacitor means individually connected across the devices and charged when said thyristor connected thereto is conducting, pulse supply means for producing regularly recurring pulses, first and second rectifier means individually connecting said pulse supply means to said gate electrodes of said first and second thyristors respectively, said rectifier means connected to a conducting thyristor being biased to be non-conducting by the potential at said gate means thereof so that each pulse is applied only to said thyristor which is non-conducting to render the same conducting, with initial conduction of one thyristor providing a surge of current therethrough so that the potential across said inductor means reduces the potential applied to said first and second thyristors, and said capacitor means coupled to the other thyristor being charged by conduction thereof to provides a potential to said other thyristor to cut off the same.

5. An electrical circuit for alternately energizing first and second cyclically operated devices including in combination, potential supply means providing a direct current potential between a first voltage point and a reference point, first and second reverse blocking triode thyristors each having a gate electrode and output electrodes providing a conducting path in response to a pulse applied to said gate electrode, inductor means, circuit means connecting each of the devices in series with said output electrodes of one of said thyristors and with said inductor means in the order named between said reference point and said first voltage point, first and second capacitor means individually connected across the devices and charged when said thyristor connected thereto is conducting, third capacitor means connecting said gate electrode of said first switch means to said first voltage point to initially render said first switch means conductive, pulse supply means for producing regularly recurring pulses after an initial delay period, and first and second rectifier means individually connecting said pulse supply means to said gate electrodes of said first and second switch means respectively, said rectifier means connected to a conducting thyristor being biased to be non-conducting by the potential at said gate means thereof so that each pulse is applied only to said thyristor which is non-conducting to render the same conducting, with conduction of one thyristor providing a surge of current therethrough to cause a drop in the potential across said inductor means which reduces the potential applied to said first and second thyristors, and said capacitor means coupled to the other thyristor being charged by conduction thereof to provide a reverse bias potential at said other thyristor to cut off the same.

6. An electrical circuit for alternately energizing first and second lamps including in combination, potential supply means providing a direct current potential between a first voltage point and a reference point, first and second reverse blocking triode thyristors each having a gate electrode and output electrodes providing a conducting path in response to a pulse applied to said gate electrode, inductor means, circuit means connecting each of said lamps in series with said output electrodes of one of said thyristors and with said inductor means in the order named between said reference point and said first voltage point, first and second polarized capacitor means individually connected across the lamps and charged when said switch means connected thereto is conducting, third capacitor means connecting said gate electrode of said first switch means to said first voltage point to initially render said first switch means conductive, pulse supply means for producing regularly recurring pulses after an initial delay period, and first and second rectifier means individually connecting said pulse supply means to said gate electrodes of said first and second thyristors respectively, said rectifier means connected to a conducting thyristor being biased to be non-conducting by the potential at said gate means thereof so that each pulse is applied only to said thyristor which is non-conducting to render the same conducting, with conduction of one thyristor providing a surge of current through the lamp connected thereto to cause a drop in potential across said inductor means which reduces the potential applied to said first and second thyristors, and said capacitor means coupled to the other thyristor being charged by conduction thereof to provide a bias potential at said other thyristor to cut off the same.

7. An electrical circuit for alternately energizing first and second lamps including in combination, potential supply means providing a direct current potential between a first voltage point and a reference point, first and second reverse blocking triode thyristors each having a gate electrode and output electrodes providing a conducting path in response to a pulse applied to said gate electrode, inductor means, circuit means connecting each of the lamps in series with said output electrodes of one of said thyristors and with said inductor means in the order named between said reference point and said first voltage point, first and second capacitor means individually connected across the lamps and charged when said thryistor connected thereto is conducting, third capacitor means connecting said gate electrode of said first switch means to said first voltage point to initially render said first switch means conductive, pulse supply means for producing regularly recurring pulses after an initial delay period, first and second rectifier means individually connecting said pulse supply means to said gate electrodes of said first and second thyristors respectively, said rectifier means connected to a conducting thyristor being biased to be non-conducting by the potential at said gate means thereof so that each pulse is applied only to said thyristor which is non-conducting to render the same conducting, with conduction of one thyristor providing a surge of current through the lamp connected thereto to cause a drop in the potential across said inductor means which reduces the potential applied to said first and second thyristors, and said capacitor means coupled to the other thyristor being charged by conduction thereof to provide a reverse bias potential at said other thyristor to cut off the same, and first and second resistor means individually connected across the lamps, said resistor means and said lamps forming discharge paths for said capacitor means, with each resistor means acting to discharge the associated capacitor means so that the circuit remains operative in the event that the associated lamp burns out.

8. An electrical circuit for alternately energizing first and second lamps including in combination, first and second reverse blocking triode thyristors each having a gate electrode and output electrodes providing a conducting path in response to a pulse applied to said gate electrode, inductor means, circuit means connecting each of the lamps in series with said output electrodes of one of said thyristors and with said inductor means across potential supply means, first and second capacitor means individually connected across the lamps and charged when said thyristor connected thereto is conducting, means applying a pulse to said gate electrode of said first thyristor to render said first thyristor conducting to initiate operation of the circuit, pulse supply means for producing regularly recurring pulses after an initial delay period, first and second rectifier means individually connecting said pulse supply means to said gate electrodes of said first and second thyristors respectively, said rectifier means connected to a conducting thyristor being biased to be non-conducting by the potential at said gate means thereof so that each pulse is applied only to said thyristor which is non-conducting to render the same conducting, with conduction of one thyristor providing a surge of current through the lamp connected thereto to cause a drop in the potential across said inductor means which reduces the potential applied to said first and second thyristors, and said capacitor means coupled to the other thyristor being charged by conduction thereof to provide a reverse bias potential at said thyristor connected thereto to cut off the same, and a resistor connected across each lamp, said lamp and said resistor acting to discharge the associated capacitor means when said thyristor associated with said lamp is cut off with said resistor acting to discharge the associated capacitor means so that the circuit remains operative in the event that the associated lamp burns out.

References Cited

UNITED STATES PATENTS

| 3,113,241 | 12/1963 | Yonushka | 315—200 |
| 3,209,237 | 9/1965 | Wiest | 307—88.5 X |
| 3,281,643 | 10/1966 | Boeker | 307—88.5 X |
| 3,309,527 | 3/1967 | Walker | 331—113 X |

JAMES W. LAWRENCE, *Primary Examiner.*

S. A. SCHNEEBERGER, *Assistant Examiner.*